April 27, 1926.

C. C. HANSEN 1,582,464

VALVE FOR SQUARE PISTON ENGINES

Filed March 27, 1925   4 Sheets-Sheet 1

INVENTOR.
Charles C. Hansen.
BY Herbert G. Ogden
HIS ATTORNEY

April 27, 1926.  
C. C. HANSEN  
1,582,464  
VALVE FOR SQUARE PISTON ENGINES  
Filed March 27, 1925  
4 Sheets-Sheet 2

INVENTOR.  
Charles C. Hansen.  
BY Herbert G. Ogden  
HIS ATTORNEY.

April 27, 1926.
C. C. HANSEN
1,582,464
VALVE FOR SQUARE PISTON ENGINES
Filed March 27, 1925   4 Sheets-Sheet 3
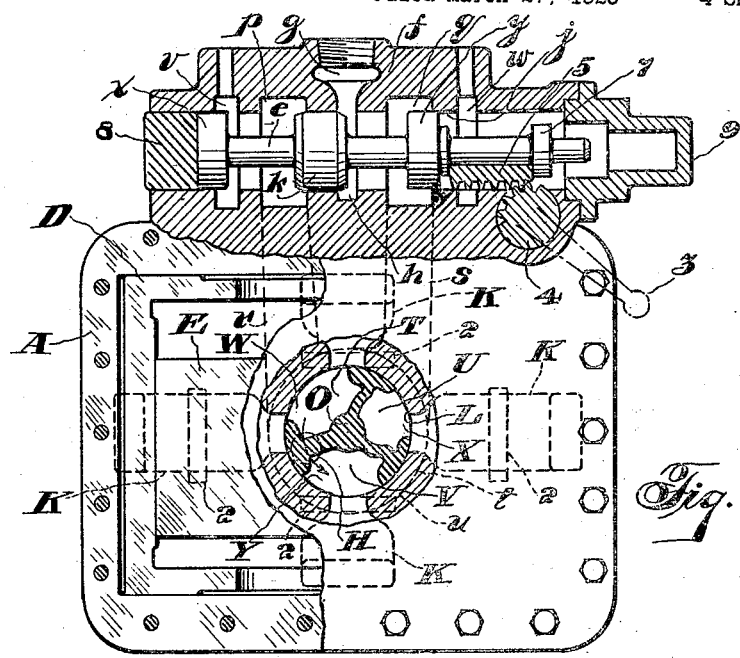
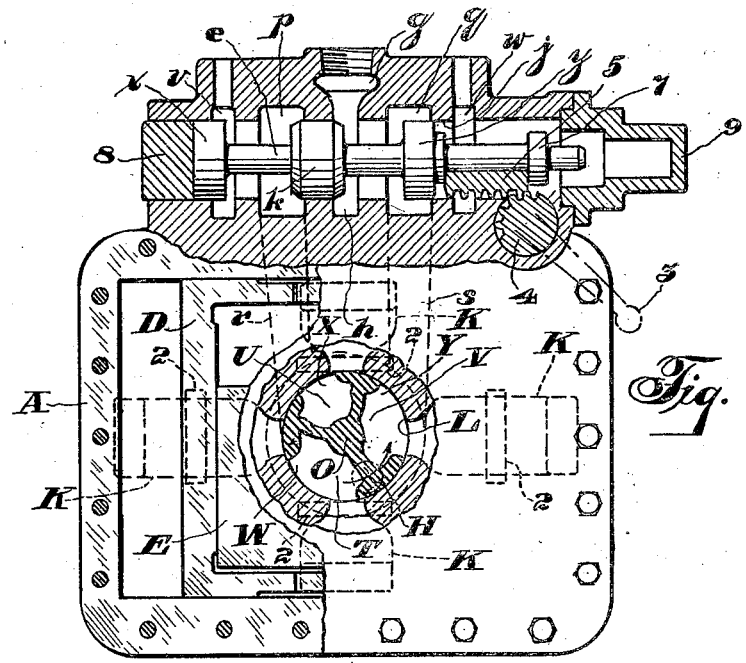
INVENTOR.
Charles C. Hansen.
BY
HIS ATTORNEY.

April 27, 1926.

C. C. HANSEN

VALVE FOR SQUARE PISTON ENGINES

Filed March 27, 1925          4 Sheets-Sheet 4

1,582,464

INVENTOR.
Charles C. Hansen.
BY Herbert A. Ogden
HIS ATTORNEY.

Patented Apr. 27, 1926.

1,582,464

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

VALVE FOR SQUARE-PISTON ENGINES.

Application filed March 27, 1925. Serial No. 18,689.

*To all whom it may concern:*

Be it known that I, CHARLES C. HANSEN, a citizen of the United States, a resident of Easton, in the county of Northampton and State of Pennsylvania, have invented a certain Valve for Square-Piston Engines, of which the following is a specification, accompanied by drawings.

This invention relates to fluid actuated reciprocating engines, and more particularly to that type in which there is provided a square cylinder and a frame piston reciprocating therein and carrying an inner piston arranged to reciprocate within the frame piston, both of the pistons operatively associated with a crank pin of a drive shaft by which the power is transmitted.

A disadvantageous feature of these engines has been that the pressure of the motive fluid against the side of the piston causes end thrust producing friction and wear reducing the motor efficiency. It is an object of this invention to eliminate end thrust and side wall friction in an engine of this type. Another object of the invention is to provide early cut-off to increase the efficiency of the motive fluid and to utilize expansion of the motive fluid to do work.

Further objects and advantages of the invention will be in part obvious and in part pointed out hereinafter.

Figure 1:
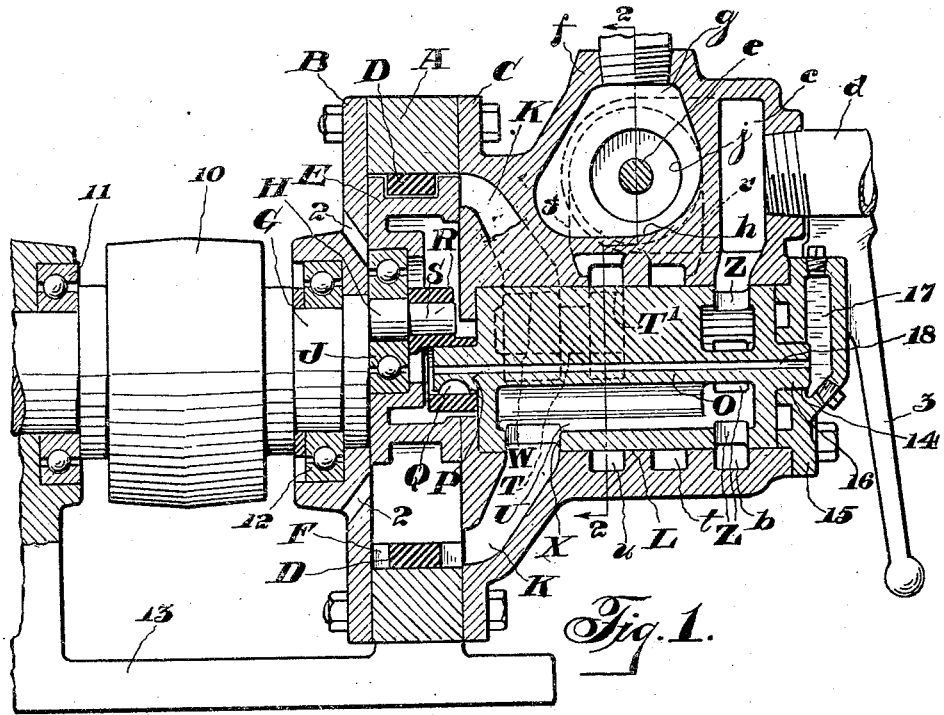
Figure 2:
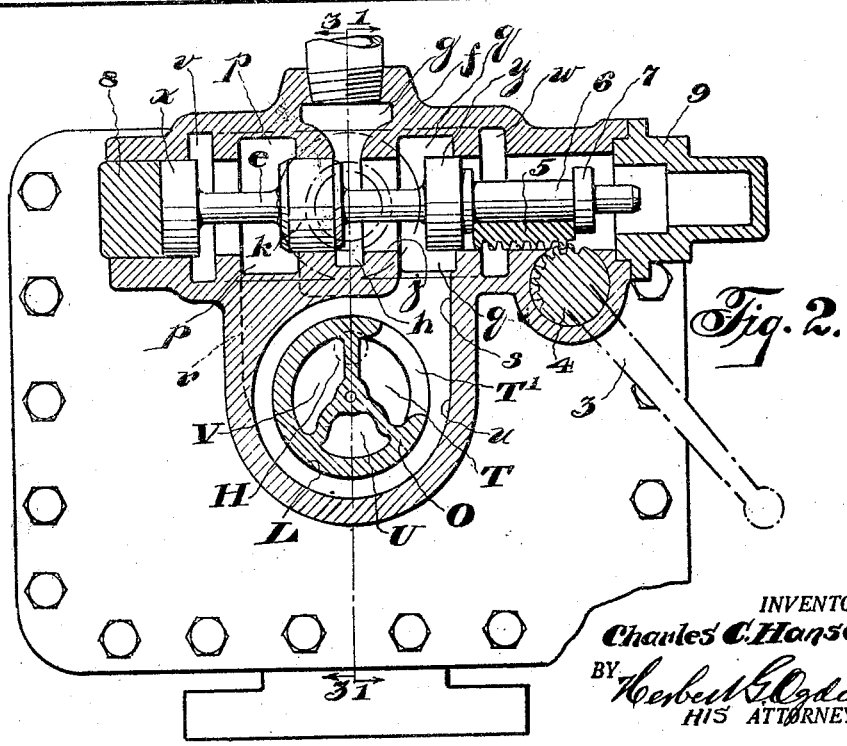
Figure 3:
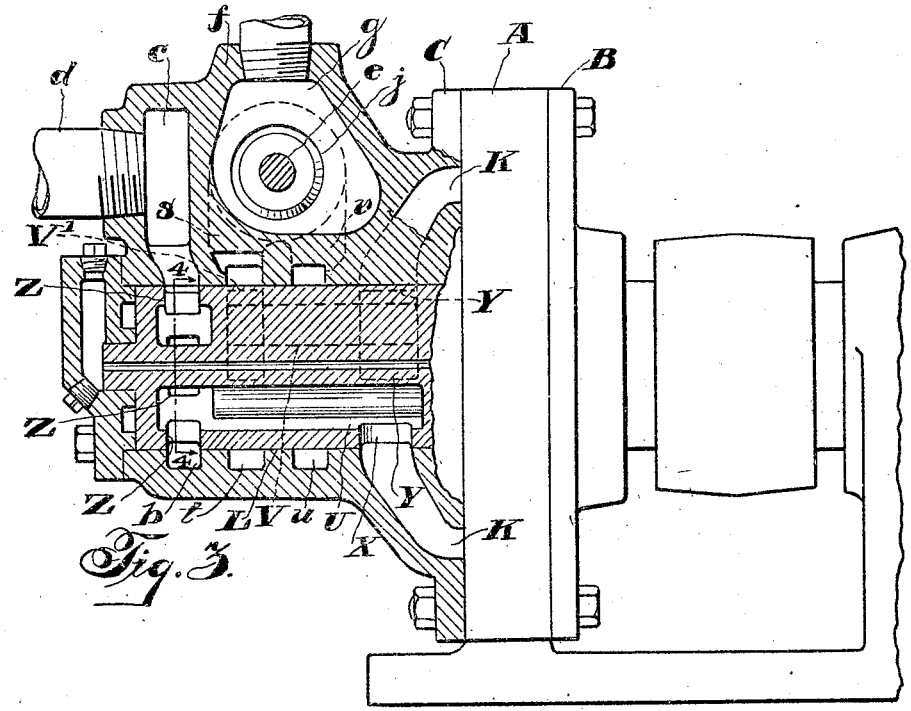
Figure 4:
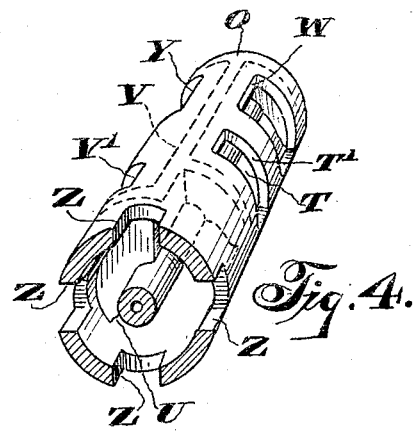

In the drawings forming part of this specification and in which similar reference characters refer to similar parts, showing a preferred form of the invention, Figure 1 is a longitudinal sectional elevation of a reciprocating engine constructed in accordance with the practice of the invention, Figure 2 is a cross-section along the line 2—2 of Figure 1 looking in the direction of the arrows and shows a throttle valve adapted to control the inlet of motive fluid to the distributing valve, Figure 3 is a longitudinal sectional view of the engine looking at the side opposite that shown in Figure 1, Figure 4 is a perspective view of the rotary distributing valve, Figures 5, 6, 7 and 8 are diagrammatic representations showing the cooperation of the distributing valve with the ports leading to the ends of the cylinder and four positions of the valve and pistons.

Referring to the drawings, the engine comprises a square cylinder A having a rear head B and a front head C within which a frame piston D is adapted to reciprocate. An inner piston E is arranged to reciprocate with the frame piston D and in order to expose the opposite faces of the inner piston E to motive fluid, portions of the frame piston D are cut away as at F. The inner piston E is arranged to move in a direction at an angle to the direction of motion of the frame piston D preferably at right angles thereto. The pistons D and E are associated with a drive shaft G by means of a crank pin H extending from the rear cylinder head B in the interior of the cylinder A. The crank pin H is provided with a suitable anti-friction bearing J in the inner piston E. The horizontal motion of the frame piston D as indicated in the drawing, is transmitted to the crank pin H through the inner piston E. The resultant motion of the frame piston D and the inner piston E produces a rotary motion in the crank pin H whereby the drive shaft G is rotated.

The outer head C is provided with passages K arranged quadrantally so as to communicate with the four ends of the square cylinder A. Their purpose is to connect the ends of the cylinder A with a valve chamber L for conducting motive fluid to the cylinder and exhaust fluid therefrom. The flow of motive fluid and exhaust fluid through the passages K is preferably controlled by a cylindrical rotary distributing valve O arranged to rotate in the chamber L and adapted to be actuated by the drive shaft G. To this end a projecting end P of the valve O is attached by means of a key Q to an arm R actuated by an extension S on the crank pin H. The valve O is thus rotated synchronously with the drive shaft G.

The distributing valve O is provided with three chambers T, U and V. As shown in Figures 4 to 8 inclusive, the chambers T, U and V are provided with ports W, X and Y respectively, which are adapted to communicate successively with each of the passages K as the valve O rotates. Either the chamber T or the chamber V may be used for inlet or exhaust depending upon the direction in which it is intended to rotate the drive shaft G. The chamber U is permanently in communication with atmosphere, through the port Z near the outer end of the valve O. A groove b cut in the valve chamber L adjacent the port Z leads by means of a passage c to an exhaust pipe d.

The supply of motive fluid to the distributing valve O is controlled by a throttle valve e (Figure 2), which is adapted to reciprocate in a valve chest f preferably formed integrally with the front cylinder head C. The valve chest f is provided with an inlet passage g leading to a ring groove h in the bore j of the valve chest f and is opened or closed by the central flange k of the throttle valve e. Grooves p and q on either side of the central inlet groove h and in the bore j of the valve chest f lead by means of passages r and s to the ring grooves t and u respectively in the valve chamber L. The chambers V and T are provided with openings V' and T' leading respectively to the grooves t and u through the chambers T and V and are constantly in communication with these grooves. The bore j of the throttle valve chest f is provided with end grooves v and w in communication with the passage c and controlled by the end flanges x and y of the throttle valve e.

With the valve e in the position as shown in Figure 2, motive fluid is admitted into the inlet passage g and the groove h into the bore j of the valve chest and thence by way of the groove q, the passage s, and the ring groove u, through the opening T' into the chamber T of the valve O. In this position of the throttle valve e it will be seen that the chamber T of the valve O is used to conduct the motive fluid to the engine. Exhaust fluid from the engine is conducted through the port X to the chamber V into the groove t, the passage r and the ring groove p and through the bore j of the valve chest f past the flange x of the throttle valve e into the groove v and thence by way of the passage c and the pipe d to atmosphere. The groove w is cut off from communication with the bore j of the valve chest by the flange y of the throttle valve.

In order to reverse the direction of rotation of the engine, the throttle valve e is reciprocated to the opposite end of the valve chest f in which position motive fluid is admitted from the inlet passage g to the bore j of the valve chest, the groove p leading to the passage r, the groove t and thence into the chamber V of the valve O. In this position of the valve, exhaust fluid passes from the chamber T of the valve into the groove u, the passage X, the groove q and the bore j of the valve chest and thence past the flange y of the throttle valve e into the groove w and passage way c to atmosphere through the pipe d.

The operation of the engine is indicated diagrammatically in Figures 5, 6, 7 and 8.

In describing the action of the valve O with respect to the pistons D and E, it will be assumed that it is desired to rotate the shaft G in a counter-clockwise direction. The admission and exhaust of the motive fluid will be explained only with respect to the left hand end of the cylinder A, it being understood that these operations are exactly similar for all four ends of the cylinder, the timing only being different and arranged at 90° intervals. To rotate the shaft counter-clockwise, the throttle valve e is moved to the left so that the passage s communicates with the inlet g and the passage r communicates with atmosphere through the ring groove v. Accordingly the chamber T of the valve O is used for supplying motive fluid to the cylinder A while the chamber V is adapted to transmit the exhausted fluid from the cylinder. The chamber U is as always in communication with atmosphere for exhausting the motive fluid. At the beginning of the cycle the valve O is in the position shown in Figure 5, the frame piston D is at the left end of its stroke and the inner piston E is descending and is approximately at the middle of its stroke. Motive fluid is being admitted from the chamber T of the valve O to the passage K leading to the left hand end of the cylinder A to move the frame piston D toward the right. This rotates the crank.

Figure 7:
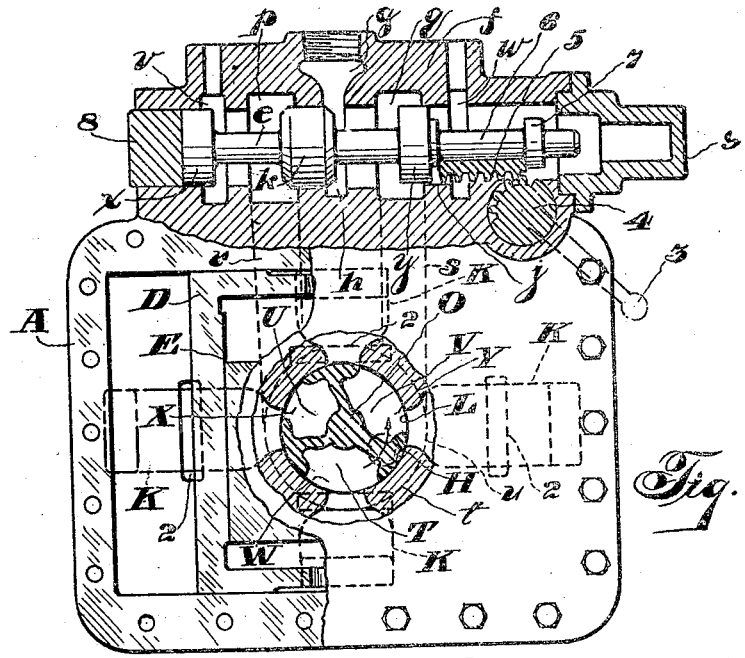
Figure 8:
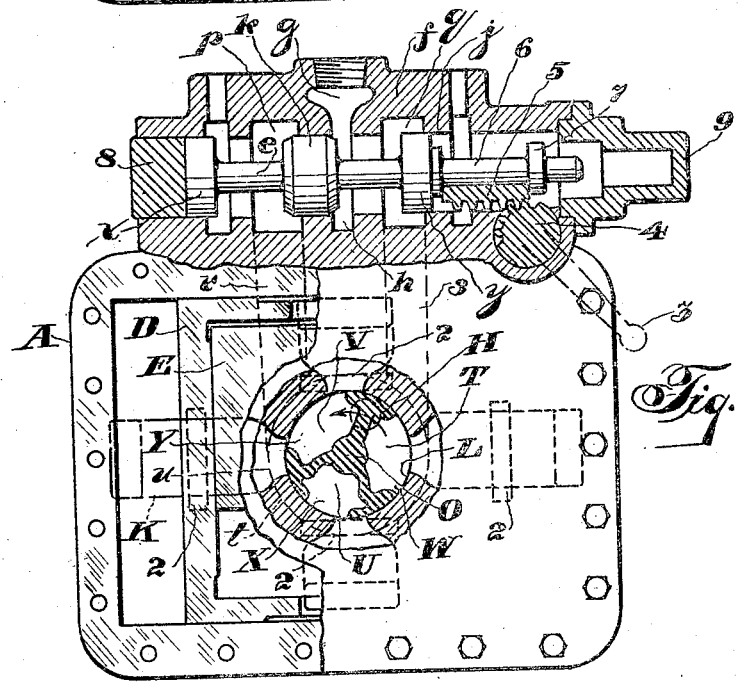

When the crank shaft has rotated so that the crank pin H is nearly to the position as shown in Figure 6, the admission of motive fluid to the left end of the cylinder A is cut off by the peripheral wall of the valve O and for a succeeding portion of the stroke of the piston D toward the right expansion of the motive fluid takes place until the valve O has rotated nearly to the position shown in Figure 7, whereupon the chamber U comes into communication with the left end of the cylinder A and permits exhaust of the motive fluid to atmosphere. As the valve O rotates to the position in Figure 8, the wall of the valve closes the passage K until upon reaching the position shown in Figure 8 the chamber V comes into communication with the passage K to exhaust the air remaining in the left end of the cylinder to atmosphere as the frame piston D moves on its return stroke.

In order to reverse the direction of rotation of the crank shaft G the valve e is moved to the right hand end of the valve chest f, whereupon the chamber V is used for conducting motive fluid to the cylinder A and the chamber T is used for conducting exhaust motive fluid to atmosphere. The valve O rotates in a clockwise direction under these conditions, the operation being similar since the chambers T and V are symmetrical with respect to the chamber U as to their cooperation with the passage K.

In order to prevent back pressure and effect complete exhaust at the end of the stroke, a set of auxiliary exhaust ports 2 are provided which are preferably apertures cut in the front cylinder head B in positions such that they are uncovered by the frame piston D and the inner piston E at the ends of their respective strokes. One of the auxiliary exhaust ports 2 is shown as it is being uncovered by the frame piston D in Figure 7. The slight loss of power due to the opening of this auxiliary exhaust is negligible and as it assists in permitting the exhausted motive fluid to escape and prevent back pressure on the return stroke, a net increase of power is transmitted to the crank pin H. It is understood that Figures 5 to 8 inclusive are diagrammatic representations and the exhaust ports v and w are in these views shown communicating directly with atmosphere through the valve chest. In actual practice, however, the ports v and w connect directly with the chamber c and the exhaust is carried from the latter chamber to atmosphere through the pipe d as shown in Figures 1, 2 and 3. The ports v and w act alternatively as exhaust ports depending upon the position of the valve e which determines the direction of rotation of the motor.

For the purpose of operating the throttle valve e there is provided a lever 3 having a shaft 4 mounted in the body of the valve chest f and provided with teeth so that the shaft 4 acts as a pinion engaging a rack 5 mounted on an extension 6 of the valve e. The rack 5 is prevented from moving longitudinally on the extension 6 by means of a collar 7 on said extension. The valve e is arranged to be removable from the valve chest f and to this end the bore j is provided with suitable plugs 8 and 9 inclosing its ends. By removing the plugs 8 and 9 and rotating the handle 3, the rack 5 is adapted to disengage the teeth on the shaft 4, whereupon the valve e may be pushed out to the left (Figure 2) from the bore j.

The shaft G may be attached to any suitable mechanism. For simplicity the shaft G is provided with a suitable pulley 10 mounted between two suitable anti-frictional journals 11 and 12 suitably supported by a base 13. The valve O is attached at one end to the arm R at its other end it rotates in a journal 14 in a cap 15 attached to the cylinder head C so as to close the bore L. The valve O is provided with a cylindrical projection 16 to cooperate with said journal. A chamber 17 is provided in the cap 15 to receive oil or grease for lubricating the valve chamber L and to supply lubricant through a longitudinal bore 18 in the valve O leading to the cylinder A by means of which oil is conducted to the bearings J of the crank pin extension S and the cylinder walls.

The invention is not to be limited to the devices shown in the drawings and described in the specification, since one form only of the invention is shown for illustrative purposes, and those skilled in the art may devise equivalent constructions without departing from the spirit of the invention as set forth in the appended claims.

I claim:

1. A fluid actuated engine comprising a casing, a square cylinder, a frame piston adapted to reciprocate in the cylinder, an inner piston adapted to reciprocate within the frame piston at an angle to the direction of motion of the frame piston, a drive shaft operatively associated with said pistons, and a rotative valve for distributing motive fluid to said cylinder having a cylindrical portion divided into three ported chambers, one of said chambers being in constant communication with atmosphere, one of the other two chambers being associated with a supply of motive fluid, and the third chamber being in communication with atmosphere.

2. A fluid actuated engine comprising a square cylinder, a frame piston adapted to reciprocate in the cylinder, an inner piston adapted to reciprocate within the frame piston at an angle to the direction of motion of the frame piston, a drive shaft having a crank pin operatively associated with said pistons, a throttle valve, a throttle valve chest having an inlet passage and passages adapted to associate with the inlet passage in alternative positions of the throttle valve, and a distributing valve adapted to be rotated by the drive shaft having ports to register with the passages in said valve chest and arranged to control the supply and exhaust of motive fluid at the ends of the cylinder, said valve having a cylindrical portion divided into three ported chambers, one of said chambers being in constant communication with atmosphere, the other two chambers being controlled by the throttle valve and adapted to be associated with a supply of motive fluid and atmosphere.

3. A fluid actuated engine comprising a square cylinder, a frame piston adapted to reciprocate in said cylinder, an inner piston within the frame piston adapted to reciprocate at an angle to the direction of motion of the frame piston, a drive shaft having a crank pin operatively associated with the frame piston and the inner piston, a cylinder head having four ports leading to the four sides of the square cylinder, a throttle valve, a valve chest formed integrally with the cylinder head and provided with an inlet port and passages adapted to be associated with the inlet passage in alternative positions of the throttle valve, and a distributing valve in the cylinder head arranged to be rotated by the drive shaft divided into a plurality of chambers, two of said chambers corresponding to the passages leading to the valve chest and always in communication therewith and adapted to register successively to the four ports leading to the sides of the cylinder, a third chamber being in constant communication with atmosphere and adapted to be associated successively with the ports leading to the ends of the cylinder.

In testimony whereof I have signed this specification.

CHARLES C. HANSEN.